United States Patent [19]  [11] 4,417,880
Kumagai et al. [45] Nov. 29, 1983

[54] JOINT ASSEMBLY

[75] Inventors: Tadanobu Kumagai, Toyota; Yoshinobu Iwase, Toyokawa, both of Japan

[73] Assignees: Toyota Jidosha Kogyo Kabushiki Kaisha, Toyota; Aisin Seiki Kabushiki Kaisha, Kariya, both of Japan

[21] Appl. No.: 392,616

[22] Filed: Jun. 28, 1982

[30] Foreign Application Priority Data

Oct. 6, 1981 [JP] Japan ............... 56/147729[U]

[51] Int. Cl.³ ............... F16D 3/30; F16D 3/20
[52] U.S. Cl. ............... 464/111; 464/123
[58] Field of Search ............... 464/111, 122, 123, 124, 464/905, 137; 403/337, 336, 288

[56] References Cited

U.S. PATENT DOCUMENTS 2,722,115 11/1955 Dunn ............... 464/124
2,825,213 3/1958 Dunn ............... 464/124
3,318,108 5/1967 Cadiou ............... 464/111 X
4,010,625 3/1977 Orain ............... 464/123 X
4,280,340 7/1981 Goguet ............... 464/111 X Primary Examiner—Stanley N. Gilreath
Assistant Examiner—Dao Van Huynh
Attorney, Agent, or Firm—Oblon, Fisher, Spivak, McClelland & Maier

[57] ABSTRACT

A sealing device disposed between flanges of a joint assembly comprises a sealing member having an endless shape and an end cover with its periphery held between the flanges and adapted to hold the sealing member inside of the periphery in association with the flange of a casing. The end cover has, along its periphery, first support portions spaced in equal interval and second support portions located between the adjacent first support portions. The second support portions are formed by folding back parts of the end cover and have bolt holes. The end cover further has a setting portion for the sealing member, inside of the periphery. The setting portion is recessed for a depth corresponding to the thickness of the end cover from the faces of the first and second support portions which are in contact with the flange of the casing. The faces of the second support portions which are in contact with the flange of a second shaft are in the same plane as the face of the setting portion on the side opposite to the face on which the sealing member sits.

5 Claims, 5 Drawing Figures

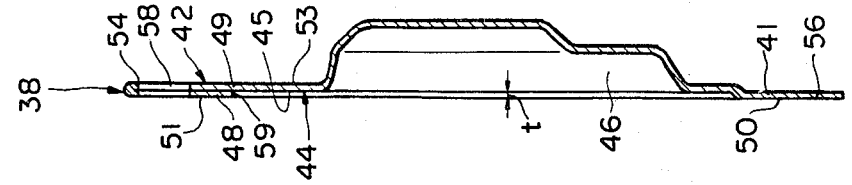
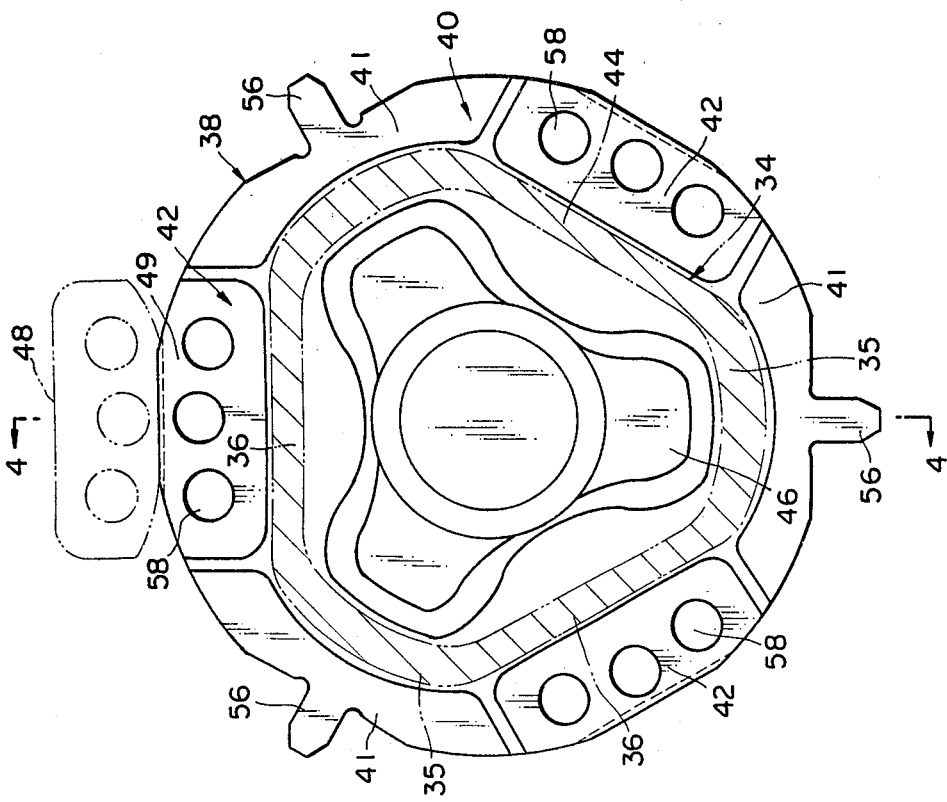

JOINT ASSEMBLY

BACKGROUND OF THE INVENTION

1. Field of the Invention

The present invention relates to a joint assembly comprising a first shaft, a casing having two openings at its axial ends, receiving an end portion of the first shaft through the opening at one end and provided with a flange on the periphery of the other end, a second shaft provided at its one end with a flange to be joined to the flange of the casing, and a sealing means provided between the flanges.

2. Description of the Prior Art

In a sealing device for a joint assembly of so-called flange coupling type, such as a tripode joint assembly, an end cover is placed as a blind plate between the flanges so that the periphery of the end cover is held between the flanges and a sealing member made of rubber is held between a portion of the end cover inside of the periphery and the flange of the casing, whereby the opening of the casing is sealed.

In order to provide the above mentioned function, the end cover is formed by pressing to have a setting portion for the sealing member inside of said periphery, which setting portion is recessed from said periphery. Consequently, the back side of the setting portion is protruded toward the flange of the second shaft.

In a tripode joint assembly to be mounted on a drive shaft assembly for an automobile, the outer diameters of the flanges are desired to be as small as possible because of the limited space for the installation. Accordingly, in order to accomodate the protruded configuration of the above mentioned setting portion of the end cover and to minimize the outer diameter of the flange, it was necessary to provide a stepped or recessed portion on the flange of the second shaft, thereby to receive the protruded setting portion of the end cover. However, in the tripode joint assembly, the contour of the casing, especially the contour of the casing formed by pressing a cylindrical member, is a generally triangular shape with rounded corner portions, and correspondingly, the setting portion of the end cover is similarly shaped. It is rather difficult to form a stepped portion having a correspondingly generally triangular shape, on the flange of the second shaft, and a special machine is required for such machining, involving great installation costs for the machine. Yet, a great deal of work will be involved in such machining.

SUMMARY OF THE INVENTION

Accordingly, it is an object of the present invention to provide a joint assembly whereby no stepped portion is required for a flange of a second shaft and yet the outer diameter of the flange can be minimized.

The present invention provides a joint assembly comprising a first shaft, a casing having two openings at its axial ends, receiving an end portion of the first shaft through the opening at one end and provided with a flange on the periphery of the other end, a second shaft provided at its one end with a flange to be joined to the flange of the casing, and a sealing means provided between said flanges. The sealing means comprises a sealing member having an endless shape and an end cover with its periphery held between said flanges and adapted to hold the sealing member in association with the flange of the casing. The end cover has first support portions spaced in equal interval from one another along said periphery, second support portions located between the adjacent first support portions, formed by folding back parts of the end cover and provided with bolt holes, a setting portion for said sealing member, located inside of the first and second support portions, and a concave portion located inside of said setting portion. The face of the setting portion on which said sealing member sits, is recessed for a depth corresponding to the thickness of the end cover, from the faces of said first and second support portions which are in contact with the flange of said casing. Further, the faces of said second support portions which are in contact with the flange of said second shaft, are in the same plane as the face of said setting portion on the side opposite to the face on which said sealing member sits.

The other objects and features of the present invention will become apparent from the following description of a preferred embodiment of the invention with reference to the accompanying drawings.

BRIEF DESCRIPTION OF THE DRAWINGS

FIG. 3 is a front view of an end cover as viewed from the side of the sealing member;

FIG. 4 is a cross sectional view taken along line 4—4 of FIG. 3; and

DESCRIPTION OF THE PREFERRED EMBODIMENTS

Figure 1:
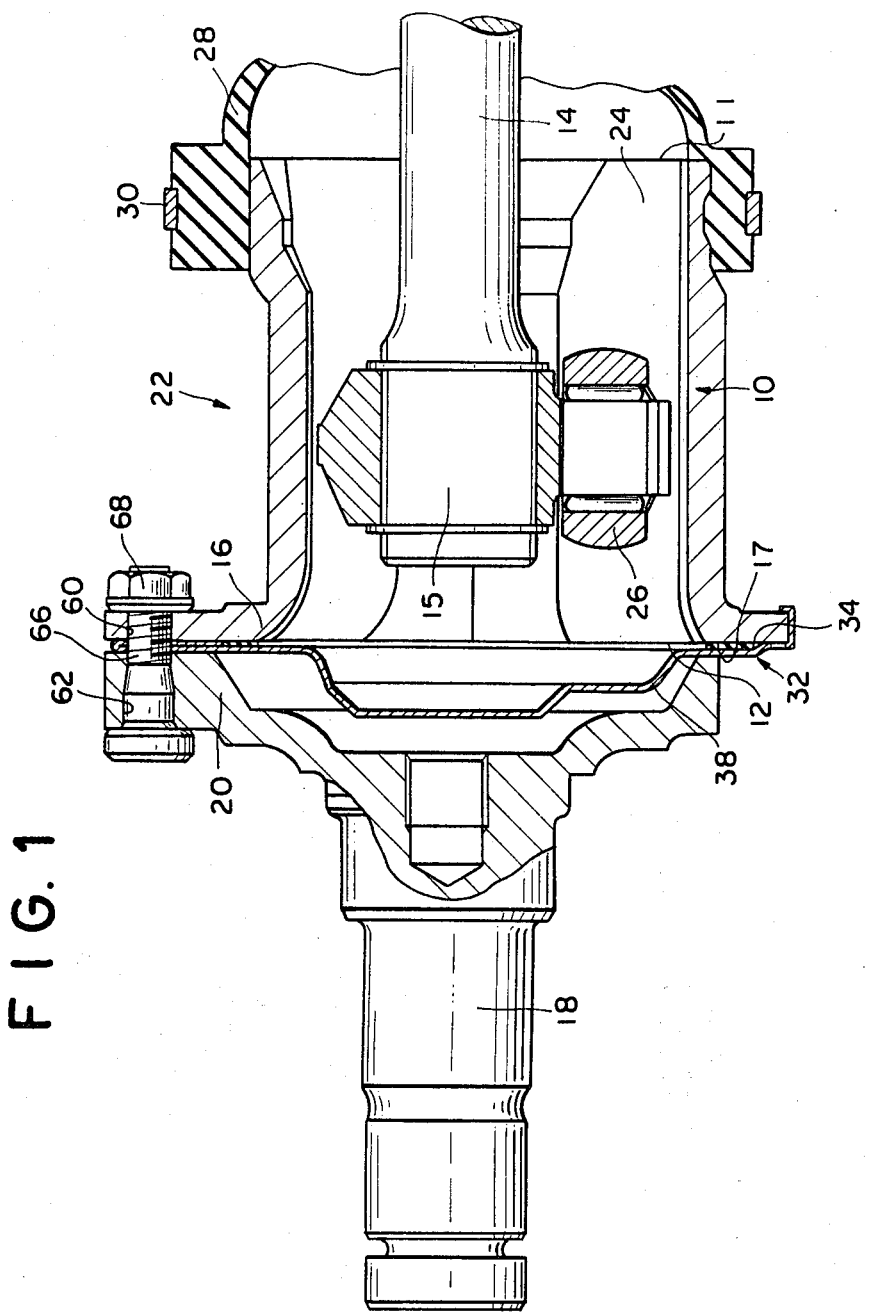
FIG. 1 is a cross sectional view of a tripod joint assembly.

Referring to FIG. 1, a joint assembly 22 of the present invention comprises a first shaft 14, a casing 10 having two openings 11, 12 at its axial ends, receiving an end portion 15 of the first shaft 14 through the opening 11 at one end and provided with a flange 16 on the periphery of the other end at the opening 12, a second shaft 18 provided at one end with a flange 20 to be joined to the flange 16, and a sealing device 32 provided between the flanges 16 and 20.

The casing 10 is internally provided with three roller grooves 24 formed circumferentially in equal interval, and three rollers 26 arranged around the end portion 15 of the first shaft 14 are received in the grooves 24.

A rubber boot 28 is put on the first shaft 14 and the end of the casing at the opening 11. One end of the boot 28 is secured to the end of the casing 10 by a clamp 30 and the other end of the boot 28 is likewise secured to the first shaft 14 by a clamp. Thus, a grease enclosed in the casing 10 is sealed by this boot 28 at the side of the opening 11. In the illustrated embodiment, the joint assembly is a tripod joint assembly which is per se known.

The above mentioned sealing means 32 comprises a sealing member 34 and an end cover 38.

Figure 2:
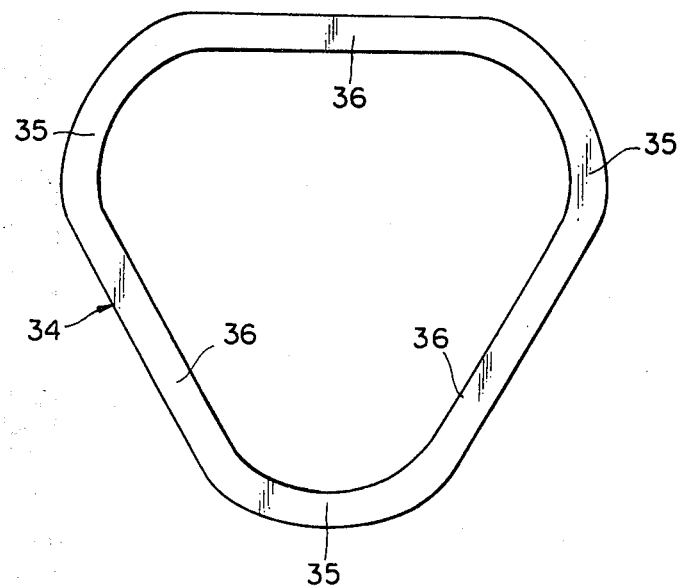
FIG. 2 is a front view of a sealing member.

The sealing member 34 is made of rubber, and has a generally triangular endless shape with three rounded corner portions 35 and three connecting portions 36 extending between the adjacent rounded corner portions 35, as shown in FIG. 2. This shape coincides almost with the cross section of the casing 10 perpendicular to the axis thereof where the casing has been formed by pressing a cylindrical member.

In the illustrated embodiment, the connecting portions 36 are linear. However, they may optionally be curved with a radius of curvature greater than that of the rounded corner portions 35. It is preferred that the connecting portions 36 are linear, and as mentioned hereinafter, bolt holes for joining the flanges 16 and 20 are provided on the periphery of the end cover 38 outside of the connecting portions 36, whereby the outer diameters of the flanges 16, 20 can be minimized. The thickness of the sealing member 34 is slightly greater than the thickness of the plate forming the end cover 38, and the difference in the thickness becomes an interference for the sealing member 34 when assembled.

On one hand, the above mentioned end cover 38 is held at its periphery 40 between the flanges 16 and 20 to cover the opening 12 of the casing 10, and on the other hand, the end cover serves to hold the above mentioned sealing member 34 in association with the flange 16 of the casing 10. As shown in FIGS. 3 and 4, along the periphery 40 of the end cover 38, there are provided three first support portions 41 and three second support portions 42. A setting portion 44 for the sealing member 34 is provided inside of the periphery 40, and a concave portion 46 is provided inside of the setting portion 44. These various portions are unitary or integral as a whole. The first support portions 41 are located on the periphery at positions outside of the respective rounded corner portions 35 of the sealing member, when the latter is placed on the setting portion 44, as indicated by the oblique lines in FIG. 3. The second support portions 42 are located on the periphery at positions outside of the respective connecting portions 36 of the sealing member 34. The setting portion 44 is recessed for a depth corresponding to the thickness "t" of the end cover, from the faces 50 of the first support portions 41 which are in contact with the flange 16 of the casing, thereby to form a flat face 45 on which the sealing member 34 sits.

As indicated by the imaginary lines in FIG. 3, the second support portions 42 are formed by folding a portion 48 protruded in a generally rectangular shape, back toward the above mentioned face 45 to be laid on a portion 49 of the periphery and pressing the portions 48 and 49 to each other to form intimate contact. In this case, it is preferred that the edge 59 of the portion 48 is cut so that it becomes perpendicular to the face 45, whereby the sealing member 34 can be placed with its connecting portions intimately abutting against the edge 59. As a result of folding the portion 48 back and pressing the portions 48 and 49, the above mentioned faces 50 of the first support portions 41 are in the same plane as the faces 51 of the second support portions 42 which are in contact with the flange 16 of the casing, and therefore, the setting portion 44 is recessed for the depth corresponding to the thickness "t" of the end cover from the faces 51 of the second portions 42. Further, the face 53 on the opposite side to the above mentioned face 45 of the setting portion 44 is in the same plane as the faces 54 of the second support portions 42 which are in contact with the flange 20 of the second shaft. Bent portions 56 are radially outwardly protruded from the centers of the respective first support portions 41 of the end cover, and three bolt holes 58 are provided on the second support portions 42.

The flange 16 provided on the casing 10 has substantially the same contour as the end cover 38 as shown in FIG. 3 with the bent portions 56 omitted, and its surface facing the faces 50 and 51 of the first and second support portions of the end cover 38 is formed into a flat joint face 17. The flange 16 is provided with bolt holes 60 in the same number and at the corresponding positions as the bolt holes 58 provided on the second support portions of the end cover 38.

Figure 5:
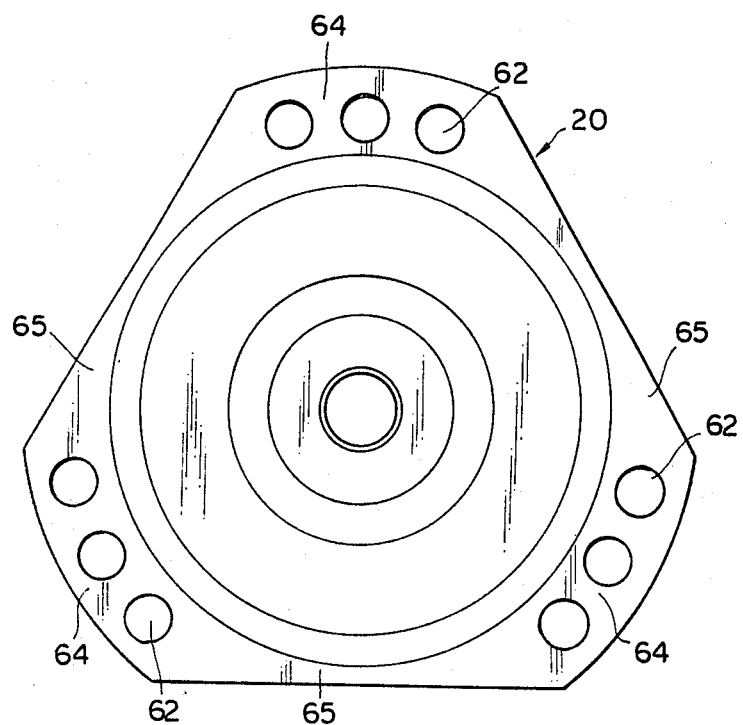
FIG. 5 is a front view of a flange of a second shaft as viewed from the side of the end cover.

As shown in FIG. 5, the flange 20 provided on the second shaft 18 has a generally triangular front shape with three rounded corner portions and three linear portions, and is provided with joint faces 64 at the rounded corner portions, each provided with three bolt holes 62, and pressure faces 65 between the adjacent joint faces 64. The bolt holes 62 of each joint face 64 are located at positions corresponding to those of the bolt holes 58 of the second support portions 42. Further, the joint faces 64 and pressure faces 65 are in the same plane.

For assemblying the joint assembly of the present invention, firstly, the sealing member 34 is placed on the setting portion 44 of the end cover 38, and then the end cover 38 is placed on the flange 16 so that the sealing member 34 abuts against the joint face 17 of the flange 16. Then, the flange 20 is placed on the flange 16 to hold the second support portions 42 of the end cover 38 between the flanges 16 and 20. Bolts 66 are then passed through the corresponding bolt holes and nuts 68 are screwed on the bolts to fasten the flanges with the end cover held therebetween. In this case, it is preferred that the bolts 66 are stud bolts fitted by press in the bolt holes 62 of the flange 20. By tightening the nuts 68 on the bolts 66, the sealing member 34 is compressed between the end cover 38 and the joint face 17 of the flange 16 to provide adequate sealing. At the same time, the second support portions 42 of the end cover 38 are pressed by the joint face 17 of the flange 16 and the joint faces 64 of the flange 20, and the first support portions 41 of the end cover 38 are pressed by the joint face 17 of the flange 16 and the pressure faces 65 of the flange 20, whereby the sealing member 34 receives uniform pressure throughout its entire structure. Thus, the flanges 16 and 20 are joined together to hold mainly the second support portions 42 of the end cover 38 therebetween, and serve to transmit a driving force from the first shaft 14, via the rollers 26 and the casing 10 to the second shaft 18, or in the reversed direction. After tightening the nuts 68 on the bolts 66, the bent portions 56 of the end cover 38 are bent over the periphery of the flange 16 and caulked against the back side of the flange 16. The sealing at the rounded corner portions 35 of the sealing member 34 is ensured more perfectly by these bent portions.

According to the present invention, it is possible to minimize the outer diameters of the flanges of a joint assembly, and yet it is unnecessary to provide a stepped portion on the flange of the second shaft. Thus, it is possible to save the installation costs and to reduce the number of processing steps, especially in the case of a tripode joint.

What is claimed is:

1. A joint assembly comprising a first shaft; a casing having two openings at its axial ends; receiving an end portion of the first shaft through the opening at one end and provided with a flange on the periphery of the other end; a second shaft provided at its one end with a flange to be joined to the flange of the casing, and a sealing means disposed between said flanges, said sealing means including a sealing member having an endless shape, and an end cover with its periphery held between said flanges and adapted to hold the sealing member in association with the flange of the casing, said end cover having first support portions spaced in equal interval from one another along said periphery, second support portions located between the adjacent first support portions, formed by folding back parts of the end cover and provided with bolt holes, a setting portion for said sealing member located inside of the first and second support portions, and a concave portion located inside of said setting portion, wherein the face of said setting portion on which said sealing member sits is recessed for a depth corresponding to the thickness of the end cover, from the faces of said first and second support portions which are in contact with the flange of said casing, and the faces of said second support portions which are in contact with the flange of said second shaft are in the same plane as the face of said setting portion on the side opposite to the face on which said sealing member sits.

2. The joint assembly as claimed in claim 1, wherein said sealing member has a generally triangular endless shape with three rounded corner portions and three connecting portions extending between the adjacent rounded corner portions, and the first support portions and the second support portions of said end cover are located outside of the rounded corner portions and the connecting portions, respectively, of said sealing member.

3. The joint assembly as claimed in claim 2, wherein each connecting portion of said sealing member is linear, and the edge of the folded back portion of each second support portion is perpendicular to the face of said setting portion.

4. The joint assembly as claimed in claim 1 or 2, wherein said end cover has bent portions radially outwardly extending from the centers of said first support portions.

5. A tripode joint assembly comprising a first shaft; three rollers arranged in equal interval around an end portion of the first shaft; a casing formed by pressing a cylindrical member, having two openings at its axial ends and three internal grooves formed circumferentially in equal interval to receive said rollers respectively, receiving the end portion of the first shaft through the opening at one end and provided with a flange on the periphery of the other end; a second shaft provided at one end with a flange which is joined to the flange of the casing and has a generally triangular front contour with three rounded corner portions and three linear portions; and a sealing means disposed between said flanges, said sealing means including a sealing member having a generally triangular endless shape with three rounded corner portions and three linear connecting portions extending between the adjacent rounded corner portions, and an end cover with its periphery held between said flanges and adapted to hold the sealing member in association with the flange of the casing, said end cover having first support portions spaced in equal interval from one another along said periphery outside of the respective rounded corner portions of said sealing member, second support portions located between the adjacent first support portions along said periphery outside of the respective connecting portions of said sealing member, formed by folding back parts of the end cover and provided with bolt holes, a setting portion for said sealing member located inside of the first and second support portions, and a concave portion located inside of said setting portion, wherein the face of said setting portion on which said sealing member sits is recessed for a depth corresponding to the thickness of the end cover, from the faces of said first and second support portions which are in contact with the flange of said casing, and the faces of said second support portions which are in contact with the flange of said second shaft are in the same plane as the face of said setting portion on the side opposite to the face on which said sealing member sits.

* * * * *